United States Patent [19]
Pizzey et al.

[11] 4,063,482
[45] Dec. 20, 1977

[54] MACHINE TOOL INDEXING MECHANISM

[75] Inventors: Anthony Reginald Pizzey; Alan James Waters, both of Ipswich, England

[73] Assignee: Caplin Engineering Company Limited, Ipswich, England

[21] Appl. No.: 710,867

[22] Filed: Aug. 2, 1976

[30] Foreign Application Priority Data

Aug. 4, 1975 United Kingdom ............... 32584/75

[51] Int. Cl.² .......................... B26D 5/20; B26D 7/06
[52] U.S. Cl. ....................................... 83/207; 83/247; 83/411 A; 83/437; 83/468
[58] Field of Search ...................... 83/207, 247, 411 R, 83/411 A, 421, 437, 468

[56] References Cited

U.S. PATENT DOCUMENTS

| | | | |
|---|---|---|---|
| 2,673,611 | 3/1954 | Seybold | 83/437 |
| 2,849,066 | 8/1958 | Michelet et al. | 83/207 |
| 3,583,268 | 6/1971 | Scribner | 83/247 X |

*Primary Examiner*—Willie G. Abercrombie
*Attorney, Agent, or Firm*—Brisebois & Kruger

[57] ABSTRACT

The present invention relates to an indexing mechanism for stepwise advancing a workpiece relative to a cutting tool of a machine tool, to enable slices or wafers of predetermined thickness to be cut from the workpiece. The indexing mechanism comprises first and second slide blocks slidable in a slideway in a slide block carrier of the machine tool. The first block carries the workpiece and the second block carries a double-acting index actuator which interconnects the two blocks and is operable to displace the blocks alternately toward and away from each other, the extent of said displacement determining the indexing stroke of the mechanism. The index actuator is provided with an adjustable end stop for adjusting the indexing stroke. The blocks are provided with clamp actuators which positively and sequentially clamp the blocks to the carrier, so that the first block is displaced away from the second block as the latter is immobilized, and the second block is displaced towards the first block as the latter is immobilized. The blocks are also provided with springs which, upon release of the clamp actuator, clamp the blocks to the carrier with a reduced clamping force sufficient to resists unintentional displacement of the blocks.

18 Claims, 11 Drawing Figures

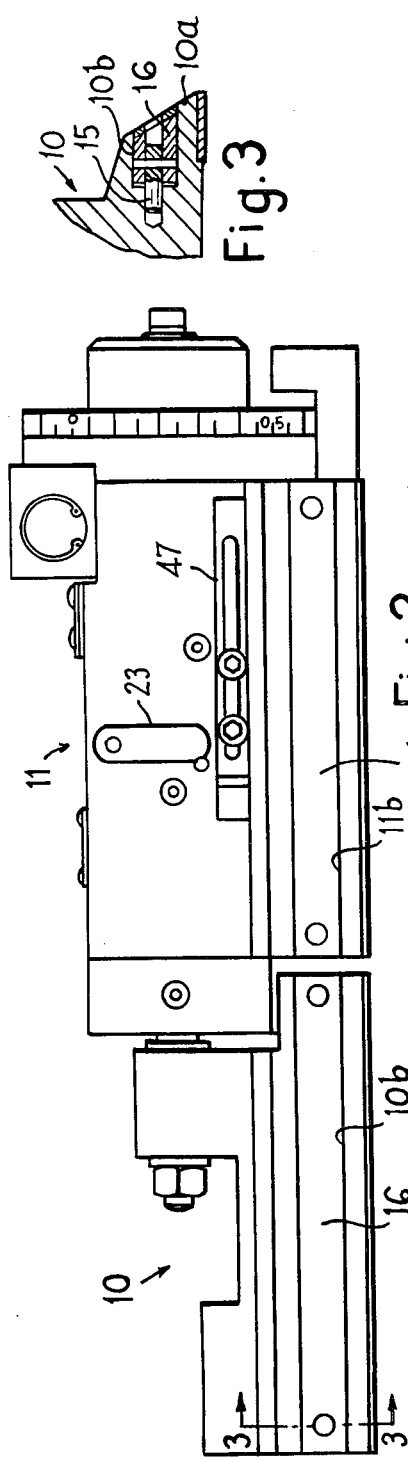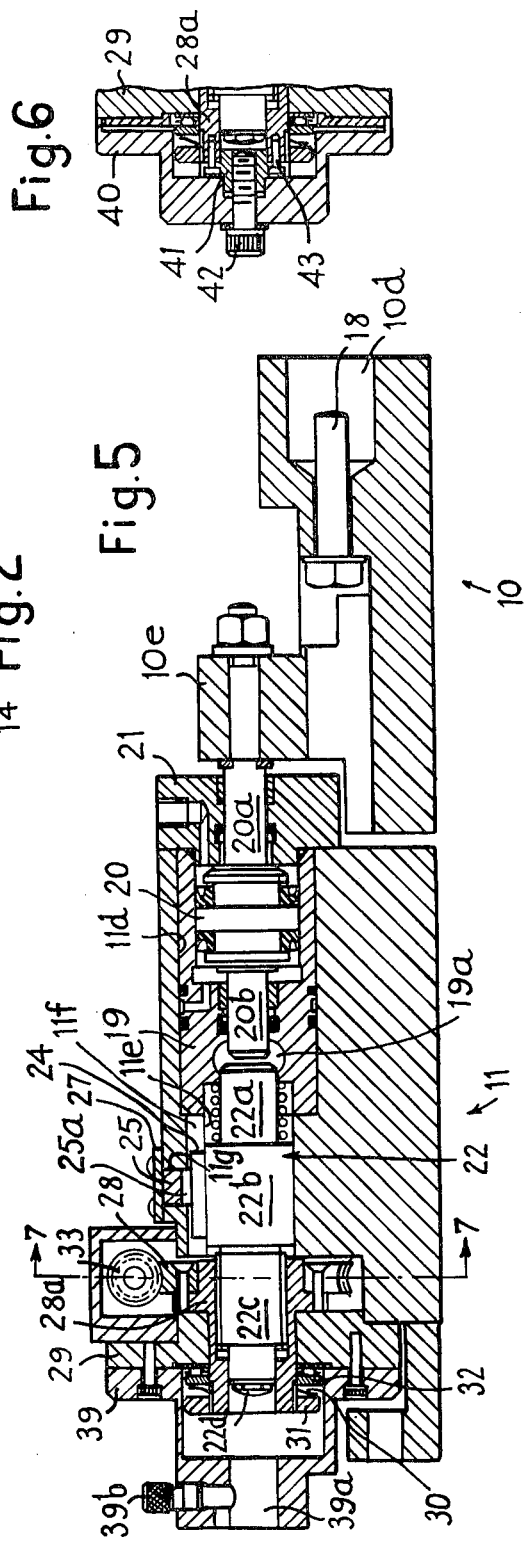

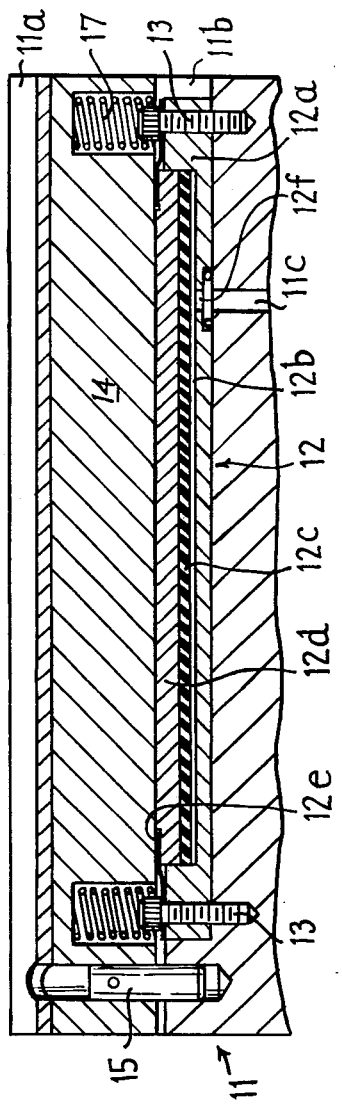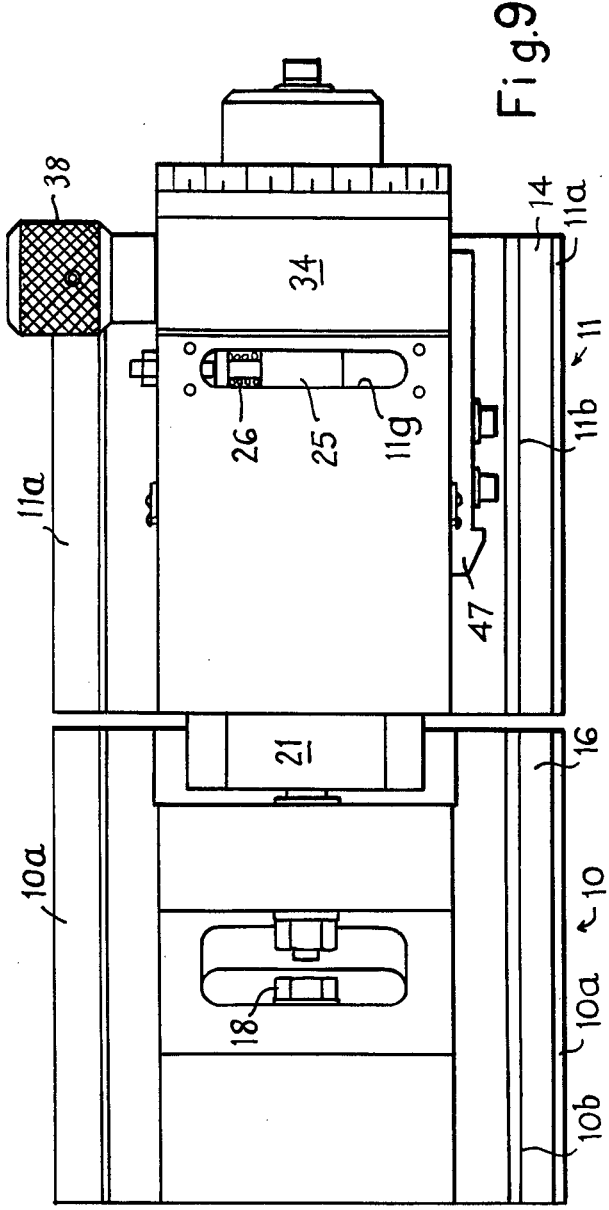

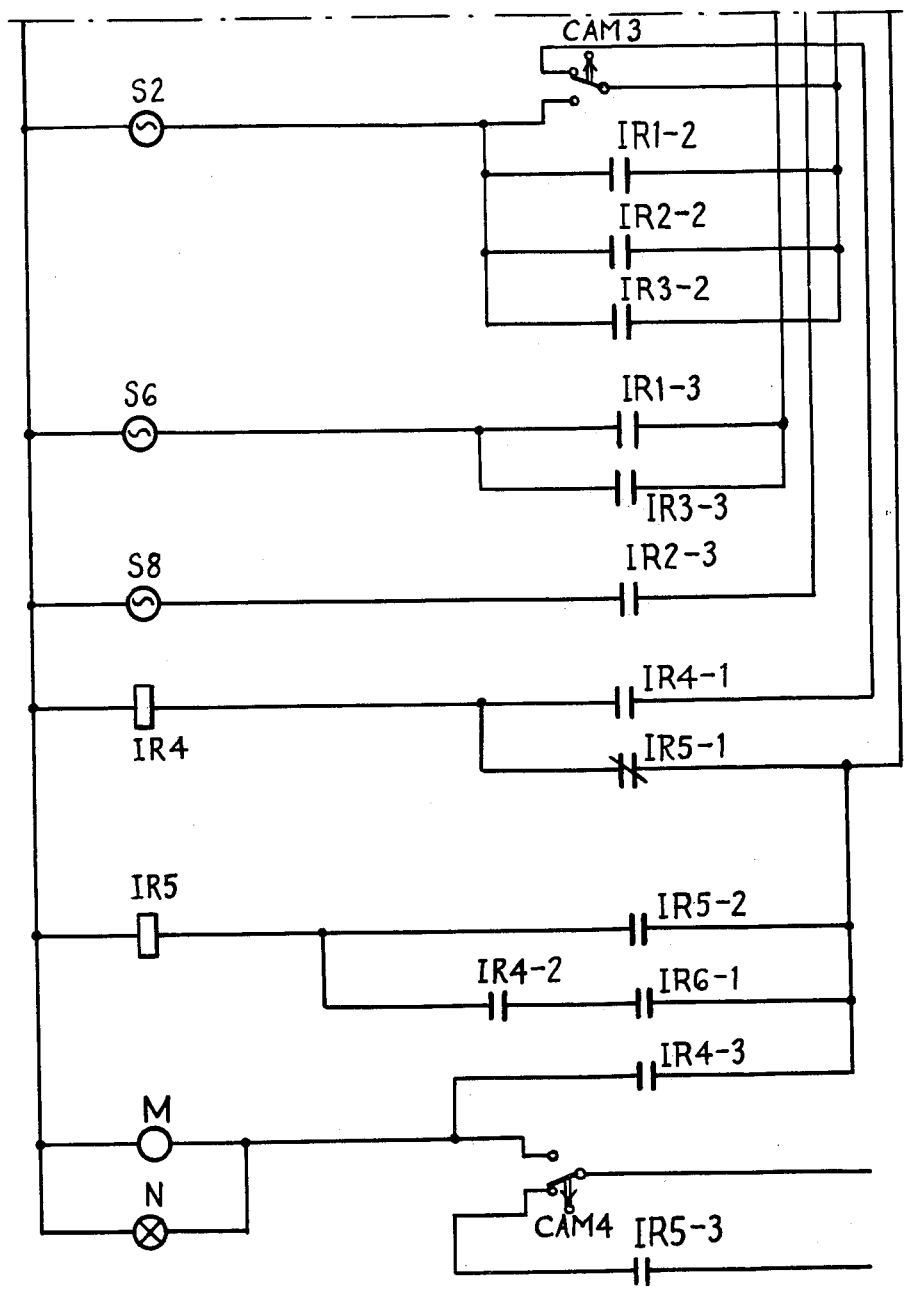
Fig.11 contd.

MACHINE TOOL INDEXING MECHANISM

The present invention relates to an indexing mechanism for repeatedly advancing, in a stepwise manner, a workpiece relative to a tool or work station of a machine tool, by a predetermined distance or distances.

According to the present invention, there is provided an indexing mechanism of the aforesaid type, comprising first and second displaceable members which are interconnected for displacement, in turn, alternately toward and away from each other, the extent of said displacement determining the indexing stroke of the mechanism, means being provided to adjust the extent of the indexing stroke, and means being provided to selectively immobilise each member during displacement of the other.

According to a feature of the present invention, the selective immobilising means comprises primary clamp means operable to positively and releasably clamp the first and second member to guide means, and secondary clamp means operable, upon release of the primary clamp means to clamp the members to the guide means with reduced clamping force sufficient to resist unintentional displacement of the members.

The primary clamp means may, for example, include fluid-pressure-operated rectilinear or linear actuators, which are actuated to displace clamping elements to positively immobilise the first and second members. The secondary clamp means may comprise springs which bias the clamping elements towards their clamping positions, with a reduced force, upon release of the actuator fluid pressure.

Positioning means, such as a fluid pressure-operated, double-acting, linear actuator may be provided to bodily advance or retract the indexing mechanism when the primary clamp means of both the first and second members are released. The positioning means may include means to limit acceleration of the mechanism when the positioning means is initially actuated.

The invention also consists in a machine tool, for example a machine of the type forming the subject of our British Pat. No: 1,319,768, provided with an indexing mechanism as defined.

In order that the invention may be more readily understood, reference will now be made to the accompanying drawings, in which:

FIG. 2 is a side elevation on an enlarged scale, of the indexing mechanism shown in FIG. 1;

FIG. 3 is a fragmentary section in line 3—3 of FIG. 2;

FIG. 5 is a longitudinal section on line 5—5 of FIG. 4, but showing modified index stop-position determining means;

FIG. 6 is a fragmentary section of the index stop-position determining means of FIG. 2;

FIG. 8 is a section on the line 8—8 of FIG. 7, on an enlarged scale;

FIG. 9 is a plan view of the indexing mechanism shown in FIG. 2;

Figure 1:
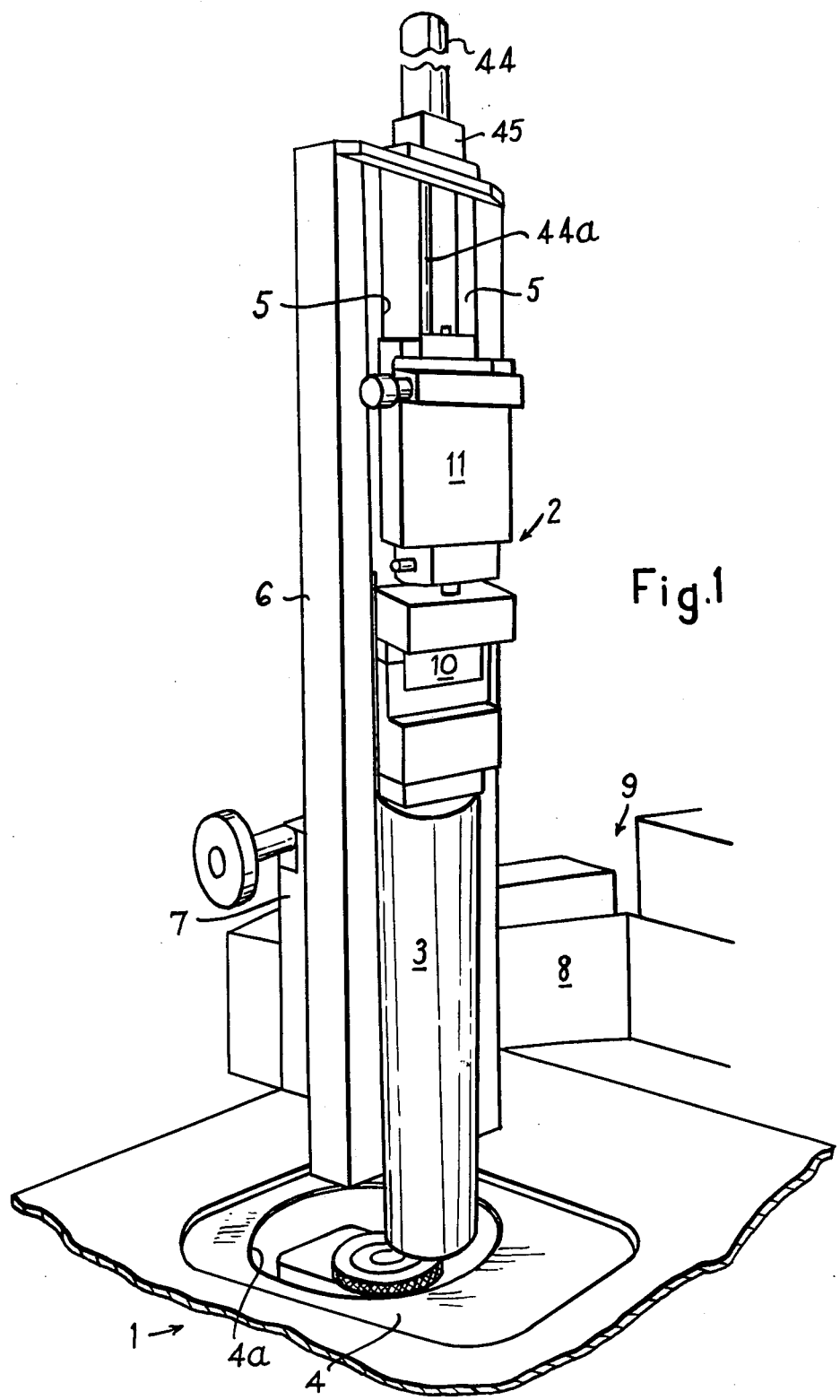
FIG. 1 is a fragmentary perspective view of a machine tool provided with an indexing mechanism according to one embodiment of the invention.

Referring to FIG. 1, the indexing mechanism embodying the invention is intended to be used in combination with a slicing or wafering machine 1 of the basic type disclosed in our earlier British Pat. No: 1,319,768, and reference should be made to the said patent for a full description of the construction and operation of this basic material. The indexing mechanism 2, which will be described in detail hereinafter, carries a cylindrical workpiece, such as a rod 3 of silicon or other crystalline material, and is operable to feed or advance the rod 3, in a stepwise manner, generally vertically downwards, into a work station where the rod is repeatedly slice into a plurality of relatively thin wafers of precisely controlled and constant thickness by means of a rotating, annular, saw blade 4 having internal teeth 4a. The indexing mechanism 2 is slidably located in a generally vertically disposed dove-tailed channel or slideway 5 of a slide block carrier 6, the latter replacing the movable plate 52 shown in FIG. 1 of the said Patent, and components carried thereby. The slide block carrier 6 is attached to a fixed upright plate 7 carried by an arm 8 of a feed mechanism 9, the latter components corresponding, respectively, to the plate 51, arm 36 and feed mechanism 35 shown in FIG. 1 of the said Patent. The arm 8 is swung or oscillated horizontally from the position shown after each stepwise downward advance of the rod 3, to bring the lower end of the rod into and out of engagement with the saw blade 4 and thereby effect a slicing operation.

Figure 4:
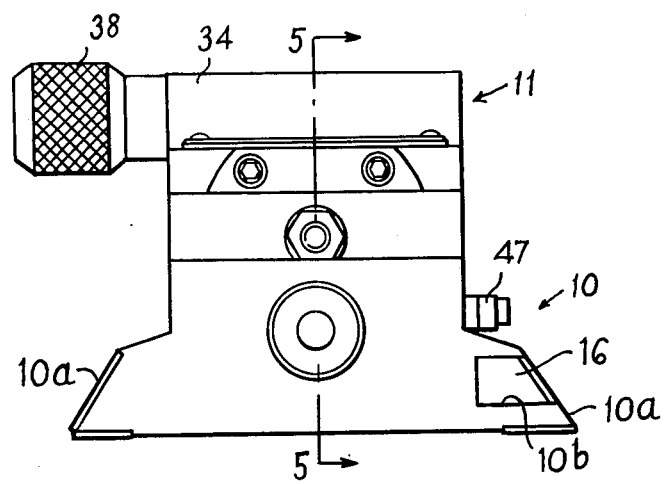
FIG. 4 is an end view of the indexing mechanism of FIG. 2, viewed from the left hand end thereof.
Figure 7:
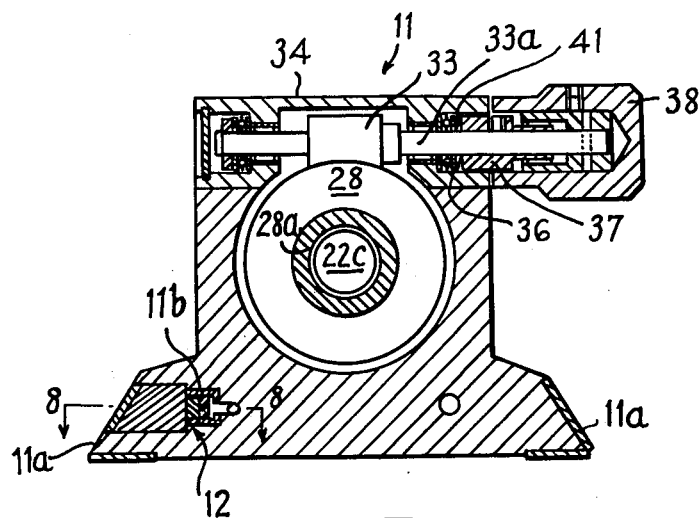
FIG. 7 is a transverse section on the line 7—7 of FIG. 5.

Referring to FIGS. 2 to 9, indexing mechanism 2 shown in FIG. 1 includes first and second indexing members comprising index slide blocks 10 and 11 respectively, the base portion of each of which is of dove-tailed configuration as clearly shown in FIGS. 4 and 7. In use, the mechanism is disposed vertically with the dove-tailed base portions slidably located in the vertical slideway 5 of the slide block carrier 6 as shown in FIG. 1, and with the slide block 10 below the slide block 11.

One of each pair of the inclined longitudinally extending dove-tail surfaces 10a and 11a of the slide blocks 10 and 11 respectively are provided with releasable primary clamp means comprising fluid pressure-operated clamp actuators associated one with each of the slide blocks. In the accompanying drawings, only the clamp actuator 12 associated with the slide block 11 is visible (see FIGS. 7 and 8) and will be described, but it is to be understood that the clamp actuators associated with both slide blocks are effectively identical in construction and operation. In the embodiment, each clamp actuator 12 is a hydraulic rectilinear actuator of the type known as a "LAMALOCK" thrust cassette or strip thrust pad manufactured by Sykes Manufacturing (Simplex) Ltd, of Leicester, England. The clamp actuator 12 shown in FIGS. 7 and 8 is located in a reduced-width base region of a laterally opening, longitudinally extending, stepped channel 11b in the slide block 11. The clamp actuator 12 comprises an elongate housing 12a secured in the base region of the channel 11b by screws 13 the housing being formed with a shallow elongate, laterally opening chamber 12b containing a slidable resilient sealing strip 12c and a slidable rigid metal thrust strip 12d, the outward sliding movement of the strips 12c and 12d being by, and the steps being retained within the chamber 12b by, retaining clips 12e. The base of the housing 12a is formed with an inlet port 12f to the chamber 12b for receiving hydraulic fluid, for example oil, under pressure, from an aligned duct 11c in the slide block 11 as shown in FIGS. 7 and 8.

The thrust strip 12d engages the inner surface of a longitudinally extending clamping element comprising a keep strip or gib strip 14 which is inserted in the enlarged outer region of the channel 11b, and is slidable therein laterally with respect to the dove-tail surface 11a. As shown in FIG. 8, the gib strip 14 is prevented from sliding longitudinally within the channel 11b by a dowel 15 secured, for example cross-pinned, in a bore in the gib strip, and slidable in a bore in the dove-tailed base portion of the slide block 11. The gib strip 14 and outer end of the channel 11b in the slide block 11 are also visible in FIGS. 2 and 9, whilst the corresponding gib strip 16 and channel 10b associated with the slide block 10 are visible in FIGS. 2, 3, 4 and 9, the longitudinal location dowel 15 associated with the gib strip 16 also being visible in FIG. 3.

The thrust strip 12d and sealing strip 12c of each actuator 12 form a piston assembly which, when hydraulic pressure is applied thereto via the port 12f tends to urge the associated gib strip 14 or 16 outwardly of its associated dove-tail surface, for example to the left in FIG. 7, into engagement with the slideway 5 in the slide block carrier 6 of FIG. 1, to positively clamp the associated slide block to the carrier.

Secondary clamp means comprising compressed coil springs 17 (FIG. 8) are located between each actuator housing 12a and associated gib strip 14 or 16 so as to tend to urge the associated gib strip into engagement with the slideway 5 of the slide block carrier 6 of FIG. 1. Thus, when the associated clamp actuator 12 is not actuated, the springs apply the associated gib strip against the slideway 5 with a force less than that applied by the clamp actuator when actuated, but sufficient to prevent unintentional displacement of the associated gib strip.

The slide block 10 serves as a workpiece carriage, and for this purpose, is provided with a workpiece mount. In this embodiment, the block 10 is formed with a stepped bore 10d (FIG. 5) within which a base or mount (not shown), attached to the axially extending cylindrical workpiece to be sliced, i.e. the rod 3 (FIG. 1), is to be secured by a mounting screw 18.

As will also be apparent from FIG. 5, the slide block 11 is formed with a longitudinally extending, stepped passage, within the largest cross-section end portion 11d of which is located indexing means comprising a hydraulic linear actuator. This actuator includes an index cylindrical 19 having a bore containing a double-acting, reciprocable index piston 20 which is provided with first and second oppositely directed, coaxial, rigid piston rods 20a and 20b.

The piston rod 20a projects through an end plate 21 of the cylinder 19, and is secured to a pillar 10e rigid with the slide block 10. The inwardly directed surface of the end plate 21 is cooperable with the adjacent end face of the index piston 20 as shown in FIG. 5, to limit the extent of the advancing or feeding movement of the piston to the right as viewed in that Figure. The extent of the retracting movement to the left is determined by cooperation of the end face of the piston rod 21b with the opposed end face of the reduced-diameter portion 22a of a stepped, axially adjustable, cylindrical index stop 22 slidably mounted within the smaller cross-section end portion 11e of the stepped passage in the slide block 11. The opposed end faces of the piston rod 20b and index stop 22 are positioned in a laterally extending opening 19a in the left hand end wall of the cylinder 19, which opening is aligned with a corresponding opening in the slide block 11 normally located behind a cover plate 23 as shown in FIG. 2.

The index stop 22 is locked against rotation by a key 24, carried by an enlarged diameter portion 22b of the index stop 22, and slidable within a keyway 11f in the passage end portion 11e. Any lateral plate between the key and keyway is eliminated by key tensioning means comprising a key tensioner block 25 (see FIGS. 5 and 9) which is laterally slidable in a slot 11g in the slide block 11, biased by an adjustable spring 26 as shown in FIG. 9. The key 24 passes through an enlarged keyway 25a (FIG. 5) in the tensioner block 25, and is resiliently urged laterally into engagement with one side of the keyway 11f by the tensioner block 25. The tensioner means is normally covered by a plate 27 which is shown in FIG. 5, but has been omitted in FIG. 9.

The left hand reduced-diameter end portion 22c of the index stop is externally threaded, and cooperates with an internally threaded passage in the hub 28a of a worm wheel 28, rotatably mounted in a support bush 29 secured to the slide block 11. Any axial play between the hub 28a and support bush 29 is eliminated by means of a resilient waved washer 30 which is compressed between a retaining nut 31 is threaded on to the outer end of the hub 28a, and the outer track of an axial thrust bearing 32 cooperating with the support bush 29. The worm wheel 28 cooperates with a worm 33 which, as shown in FIG. 7, is fixed to a laterally extending snaft 33a journalled in a worm housing 34 fixed to the slide block 11. Any axial play between the shaft 33e and housing 34 is eliminated by means of a waved washer 35 in a manner similar to that just described, the washer being compressed between an axial thrust bearing 36 and a tensioner boss 37 secured to the shaft 33a. One end of the shaft 33a extends laterally from the housing 34 and carries a knurled manually operable index control knob 38.

It will be apparent that rotation of the control knob 38 will rotate the hub 28a via the reduction gear comprising the worm 33 and worm wheel 28, thus correspondingly accurately and finely axially adjusting the index stop 22 via the cooperating screw threads of the hub and index stop. Means are provided for precisely determining the axially adjusted position of the index stop, and therefore the position of the opposed end surface of the end portion 22a thereof.

In this respect, in FIG. 5, the outer end of the hub 28a is enclosed in a cover 39 fixed to the slide block 11 via the support bush 29. The cover 39 has an axial passage 39a which is intended to receive the probe of a linear transducer (not shown), axially locked in place by a clamp screw 39b. The inner end of the probe will cooperate with, and sense, the axial position of an index stop plug 22d secured to the end of the index stop 22, and by connecting the linear transducer to an appropriate electronic device of known design having a digital read-out, a direct reading of the index stop axial setting as adjusted by the control knob 38 may be obtained.

As an alternative, the probe supporting cover 39 of FIG. 5 may be replaced by an index cap or dial 40 as shown in FIG. 6, fixed by a cap mount 41 and screws 42 and 43 to the hub 28a so as to rotate therewith. In this modification, which is also shown in FIGS. 2 and 9, the axial position of the index stop 22 relative to the index piston 20 is measured by graduations 40a (FIGS. 2 and 9) engraved around the outer perimeter of the cap or dial 40 and graduations (not shown) engraved around the control knob 38. The control knob may, for example, be engraved with 50 divisions, each equivalent to 1 micron of axial movement of the index stop 22, each full rotation of the control knob 38 being equivalent to one division of the graduations on the dial 40.

Reverting to FIG. 1, as previously described the indexing mechanism 2 is slidable up and down the carrier slideway 5, with the slide block 10 below the slide block 11, and the workpiece rod 3 depending from and rigidly carried by the slide block 10. The indexing mechanism 2 is bodily displaceable by means of a double-acting, hydraulic, positioning linear actuator 44, the cylinder of which is attached to a plate 45 at the upper end of the carrier 6. The actuator piston is connected to a depending piston rod 44a, the lower end of which is attached to a bracket 46 (FIG. 5) fixed to the upper end of the slide block 11 (i.e. the left-hand end in FIG. 5). The machine may accept workpiece rods approximately 500 m.m. long, in which event the carrier slideway 5 will accommodate at least 500 m.m. movement of the slide blocks 10 and 11, and the positioning linear actuator 44 will have a stroke of at least 500 m.m. At least the lower limit position of the indexing mechanism is determined by an adjustable stop 47 (FIGS. 2, 4 and 9) which co-operates with one or more limit switches (not shown) on the carrier 6.

In operation the thickness of the slices which are to be cut is initially pre-set by adjusting the control knob 38 accordingly, thereby adjusting the gap between the opposed end faces of the index piston rod 20b and index stop portion 22a. With the workpiece rod 3 fitted, with the indexing mechanism 2 raised by the positioning actuator 44, and with the piston rod 20a advanced and the upper and lower slide blocks 10 and 11 spaced apart as shown in FIG. 5, the rectilinear clamp or gib strip actuators 12 of both slide blocks are pressurized, and thereby actuated, thus immovably clamping the slide blocks by their gib strips 14 and 16 within the carrier slideway 5. An initial slice is then cut from the lower end of the rod 3. The hydraulic pressure applied to the clamp or gib strip actuator 12 of the upper slide block 11 is then released to unclamp this block, and the right hand side of the index piston 20 in FIG. 5 pressurized to retract the piston rod 20a and draw the upper slide block 11 down towards the lower slide block 10 until the opposed end faces of the index stop portion 22a and piston rod 20b abut. The clamp actuator 12 of the upper slide block 11 is then re-pressurised, and the clamp actuator of the lower block 10 is de-pressurised, thus respectively clamping the upper block and unclamping the lower block. The right hand side of the index piston 20 is then de-pressurized, and the left hand side pressurised, to displace the piston rod 20a to its advanced position as shown in FIG. 5, in which the opposed end faces of the index piston 20 and end plate 21 abut, advancing the piston rod 20a, and displacing the lower block 10 downwardly, by the width of the gap between the end faces or the index stop portion 22b and piston rod 20b. Pressure is then applied to the clamp actuator of the lower block 10 to re-clamp that block, whereafter a slicing operation is carried out by the slicing machine 1.

The previously described indexing sequence, in which the unclamped upper side block 11 is drawn down towards the clamped lower slide block 10, and then the unclamped lower slide block 10 is driven down away from the clamped upper slide block 11, is repeated for each successive slicing operation. During this stepwise downward advance movement of the indexing mechanism, the mechanism draws the piston of the positioning actuator 44 downwardly, whereafter, when the workpiece rod 8 has been consumed, both the upper and lower blocks 10 and 11 are unclamped, and the positioning actuator 44 is actuated to draw both blocks upwardly to the top of their stroke, and a new workpiece is mounted.

Since, when the clamp actuators 12 are vented or de-pressurised, the gib strips 14 and 16 are still biased by their springs 17 (FIG. 8), the gib strips 14 or 16 of the unclamped blocks 10 or 11 are still urged against the carrier slideway 5 with sufficient force to prevent the slide blocks from moving, for example sliding down the slideway 5 under the effect of their own weight, until the index piston 20, or positioning actuator 44, is actuated.

The control and operation of the various actuators will now be described with reference to FIGS. 10 and 11.

Figure 10:
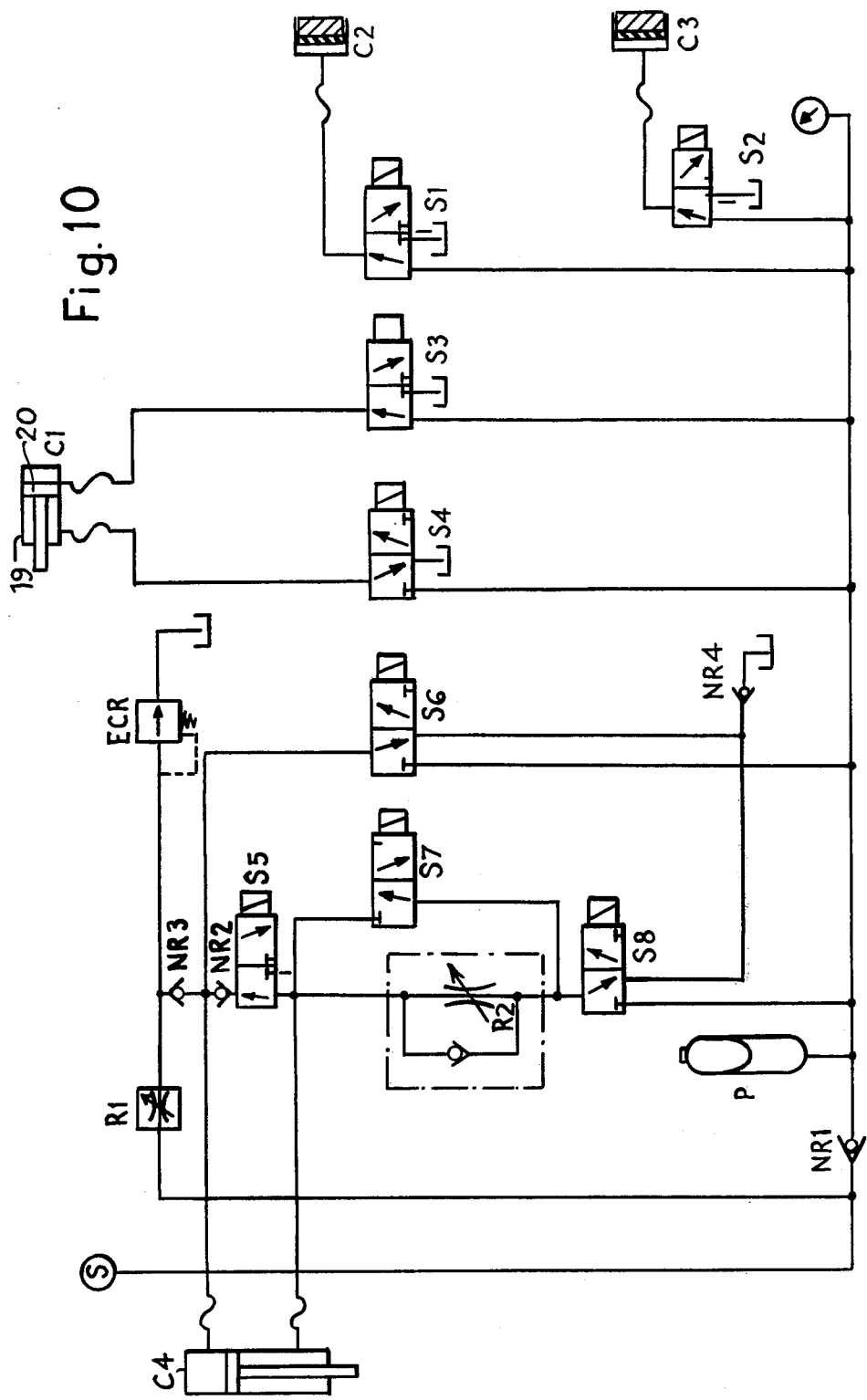
FIG. 10 is a diagram of the hydraulic control circuit for the indexing mechanism.

In FIG. 10, which represents the hydraulic circuit of the actuators, the index actuator, comprising the cylinder 19 and piston 20, is designated diagrammatically as C1, whilst the clamp or gib strip actuators 12 in the slide blocks 10 and 11 are designated C2 and C3 respectively. The linear positioning actuator 44 is designated C4. The hydraulic lines of the actuators C1 and C3 are connected to solenoid-operated hydraulic valves S1 to S4, which either connect their associated actuators to a supply of hydraulic fluid, such as oil, under pressure, or vent the actuators by connecting them to a drain or tank. The hydraulic fluid supply S may be at a pressure of 400 p.s.i., and is applied via a non-return valve NR1 set to a minimum of 5 p.s.i., and a pressure reservoir P.

During downward indexing movement of the indexing mechanism, the positioning actuator C4 is not actuated, and its piston rod is drawn downwards by the indexing mechanism. In this mode, hydraulic fluid flows from the lower zone of the actuator cylinder below the piston, through a solenoid-operated hydraulic valve S5 and a non-return valve NR2 set at 5 p.s.i., minimum, and into the upper zone of the cylinder above the piston. Since the positioning actuator piston will be a differential-area piston, with the upwardly directed face having a larger effective area than the lower face, it is necessary to make up the volume of fluid in the upper cylinder zone, and this "make up" fluid is supplied via a pressure regulator valve R1 and a non-return valve NR3 set at 10 to 15 p.s.i.

When the positioning actuator C4 is to lower the indexing mechanism quickly, it is operated in a "fast down" mode by energizing the solenoid-operated valve S6 to supply pressurized fluid to the upper cylinder zone, and by energizing solenoid valves S7 and S5 to allow fluid from the lower cylinder zone to return unrestricted to the drain or tank via solenoid valves S7 and S8 and a non-return valve NR4 set to 20 p.s.i.

When the positioning actuator C4 is operated in a "slow down" mode to slowly lower the indexing mechanism, the solenoid valve S6 is again energized to pressurise the upper cylinder zone. Solenoid valve S8 is energized to momentarily allow pressure to build up to 400 p.s.i. in the lower cylinder zone, thus equalising pressure on both sides of the actuator piston to prevent the latter jumping downwardly, which would otherwise occur. Valve S5 is energised so that, when valve S8 is de-energized after its momentary energization, fluid from the lower cylinder zone bleeds through a pressure regulator valve R2 and returns to the tank via valves S8 and NR 4.

When the actuator is operated in a "fast up" mode, valves S7 and S8 are energized to allow full pressure to be applied to the lower cylinder zone of actuator C4, fluid from the upper cylinder zone returning to the tank via valves S6 and NR 4.

Figure 11:
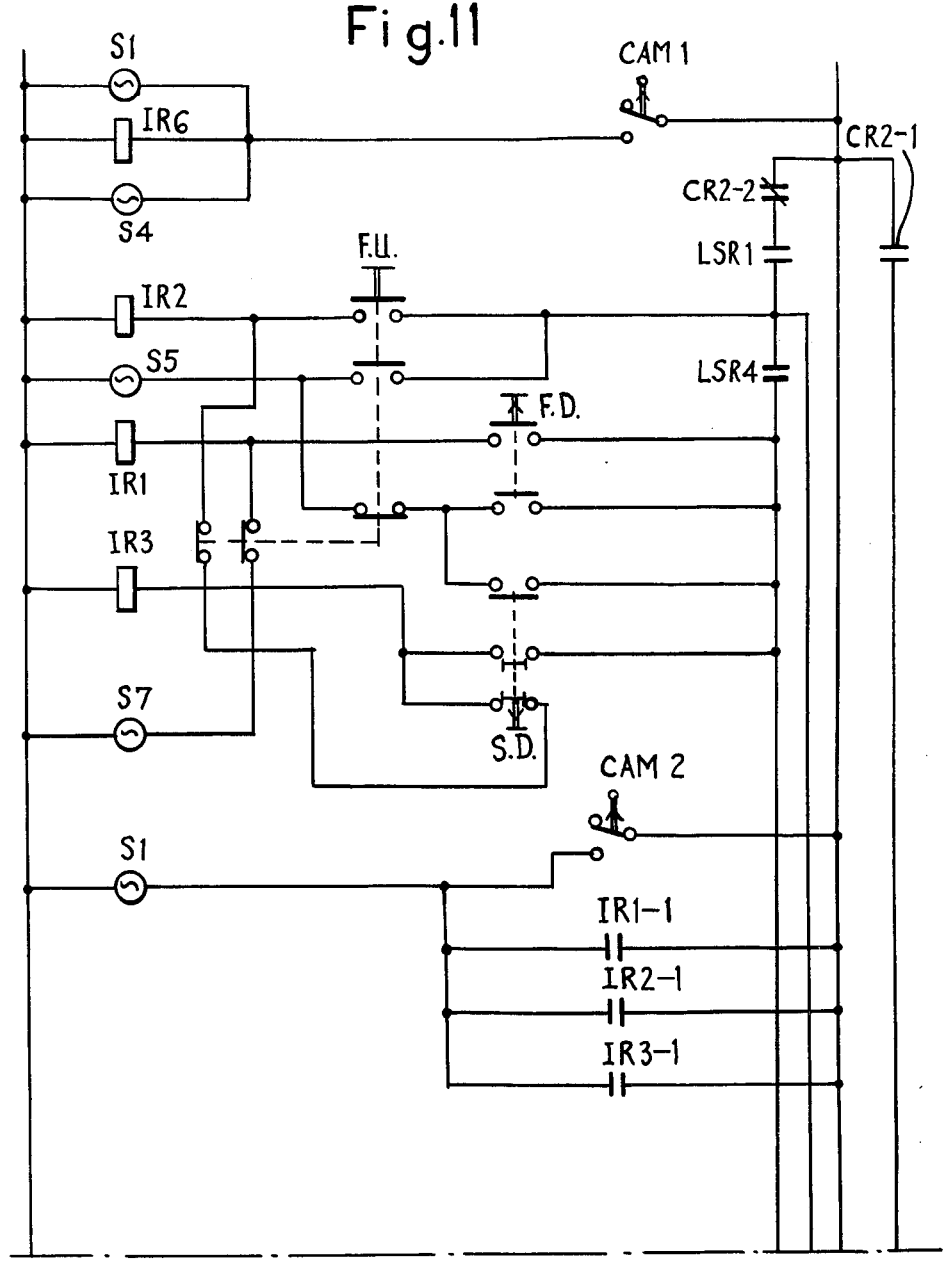
FIG. 11 is a diagram of the electrical control circuit for the indexing mechanism.

With regard to the electrical circuit of FIG. 11, the entire indexing sequence, i.e. the actuation sequence of the solenoid-operated valves S1 to S4, is controlled by a cam timer unit driven by a motor M (associated with a neon indicator lamp N), and having switches actuated by cams identified as CAM 1 to CAM 4 in FIG. 11. The "fast-up", "fast down" and "slow down" operations, i.e. the actuation of the valves S5 to S8, is controlled by manual switches FU, FD and SD respectively. Various relays IR1 to IR6 (the contacts of which are identified by suffix numerals), relay contacts CR 2-1 and CR2-2 and limit switch relay contacts LSR 1 and LSR 4, provides interlock or over-ride facilities, for example, prevent operation of the positioning actuator C4 during execution of an indexing sequence, and vice-versa, prevent operation of the clamp actuators C1 and C2 during operation of C4, and sense the upper and lower limit positions of the indexing mechanism. The operation of this electrical circuit will be apparent without further explanation.

It will be understood that various modifications may be made without departing from the scope of the present invention as defined in the appended claims. For example the indexing mechanism may be employed with machine tools other than that forming the subject of the said British patent. The mechanism may be employed to stepwise displace a workpiece relative to a tool or work station, or, alternatively, to displace the tool or work station relative to a workpiece. It will be appreciated that the various components of the mechanism will be made from appropriate materials, e.g. steel and/or other metals, and that the solenoid-operated hydraulic valves, relays and cam timer unit may be of conventional design. The hydraulic fluid may be oil, although the system may alternatively be pneumatic.

The means by which the two slide blocks are indexed relative one to the other, and/or the means by which the blocks may be selectively clamped to the associated slideway in the slide block carrier, may be replaced by other index and/or clamp means, or equivalent. For example one or both of the rectilinear gib strip or clamp actuator 12 may be replaced by one or more linear actuators, the or each of which comprises an actuator piston slidable in a bore in the associated slide block behind the associated gib strip, the piston being spring biased towards the gib strip, so that the or each actuator forms both the primary and secondary clamp means.

The indexing mechanism may be arranged to index in a vertical direction, a horizontal direction, or any other direction, and may index along a linear or non-linear (i.e. curved) path.

We claim:

1. An indexing mechanism of the type operable to effect repeated stepwise advance between a workpiece and a work station of a machine tool by an indexing stroke of predetermined length, comprising first and second displaceable members interconnected for displacement, in turn, alternately toward and away from each other, the extent of said displacement determining the indexing stroke of the mechanism, means to adust the extent of the indexing stroke, and means operable to selectively immobilise each displaceable member during displacement of the other, said selective immobilising means comprising primary clamp means operable to positively and releasably clamp the first and second displaceable members to guide means of a machine tool, and a secondary clamp means operable, upon release of the primary clamp means, to clamp the displaceable members to the guide means with a reduced clamping force sufficient to resist unintentional displacement of the displaceable members.

2. A mechanism as claimed in claim 1, wherein the first and second displaceable members are provided with clamping elements which are clampingly cooperable with the guide means of the machine tool, the primary clamp means including clamp actuators cooperable with the clamping elements to cause the clamping elements to positively immobilise the first and second displaceable members relative to the guide means.

3. A mechanism as claimed in claim 2, wherein the secondary clamp means comprises springs operable to bias the clamping elements towards their clamping positions, with a reduced force, when the clamp actuators are not actuated.

4. For a machine tool having a work station and an indexing mechanism carrier, an indexing mechanism of the type operable to effect repeated stepwise advance between a workpiece and the machine tool work station by an indexing stroke of predetermined length, the indexing mechanism comprising:
   1. first and second slide members, the first slide member being adapted to mount a workpiece, each slide member being provided with;
      a. a portion configured to slide in a corresponding slideway in the carrier;
      b. a clamp element associated with said configured portion and displaceable to clampingly cooperate with the carrier;
      c. clamp actuator means operable to releasably urge said clamp element against the carrier with a force sufficient to positively clamp the associated slide member to the carrier;
      d. spring means operable, when the associated clamp actuator means is released, to urge the clamp element against the carrier with a reduced force sufficient to resist unintentional displacement of the associated slide member;
   2. means coupling said first and second slide means together, and including index actuator means operable to effect relative displacement between said first and second slide means, alternately in a first direction towards each other and in a second direction away from each other, the extent of said displacement determining the indexing stroke of the mechanism;
   3. control means connected to said clamp and index actuator means, operable to actuate the clamp actuator means of the first slide member and release the clamp actuator of the second slide member whilst actuating the index actuator to effect displacement in one of said first and second directions, and then actuate the clamp actuator means of the second slide member and release the clamp actuator means of the first slide member whilst actuating the index actuator means in the other of said first and second directions;

4. adjustable index stop means adapted to precisely determine the extent of displacement in said first and second directions.

5. A mechanism as claimed in claim 4, wherein said configured portions of the first and second slide members slidably cooperate with a corresponding linear slideway in the carrier, and said configured portions are formed with longitudinally extending, laterally opening channels within which the clamping elements are mounted for lateral sliding movement through the lateral openings thereof, means being provided to prevent longitudinal sliding of the clamping elements relative to their associated channels.

6. A mechanism as claimed in claim 5, wherein each slide member is formed with a single channel extending longitudinally over a major proportion of the length of its associated slide member, and containing a single elongate clamping element.

7. A mechanism as claimed in claim 6, wherein the clamp actuator means of each slide member comprises a single clamp actuator located in the channel of that slide member, the clamping actuator comprising an elongate rectilinear, fluid pressure-operated actuator positioned between the base of its associated channel and clamping element, and extending longitudinally over a major proportion of the length of its associated channel.

8. A mechanism as claimed in claim 4, wherein the index actuator means comprises a double-acting linear actuator including a cylinder carried by the second slide member, and a piston arrangement including a piston reciprocable within the cylinder, the piston arrangement being connected to the first member, the control means being such that, in operation of the mechanism, the index actuator repeatedly displaces the first slide member in said second direction away from the second slide member whilst the latter is immobilised, and then draws the second slide member in said first direction towards the first slide memer whilst the latter is immobilised.

9. A mechanism as claimed in claim 8, wherein the piston arrangement is cooperable with a fixed stop to determine the maximum separation between the first and second slide members, and is cooperable with said adjustable index stop means to determine the minimum separation between the first and second slide members.

10. A mechanism as claimed in claim 9, wherein the adjustable index stop means comprises a non-rotatable cylindrical member which is slidably carried by the second slide member for movement coaxially with the piston arrangement, the cylindrical member being provided with an externally threaded zone cooperating with an internally threaded hub of an axially fixed gear which is rotatable by manually operable means associated with a visible calibrated scale to adjust the axial position of the adjustable index stop means.

11. A mechanism as claimed in claim 10, wherein said gear is a bevel gear which is cooperable with a manually rotatable worm gear to provide a reduction gear train.

12. A mechanism as claimed in claim 10, wherein the visible scale is indicative of increments of axial displacement of the adjustable index stop means, and wherein additional means are provided to indicate multiples of said increments.

13. A mechanism as claimed in claim 12, wherein said additional means comprises a calibrated dial coupled directly to the threaded hub.

14. A mechanism as claimed in claim 4, wherein the clamp and index actuator means are actuated by hydraulic fluid under pressure.

15. A mechanism as claimed in claim 4, including a hydraulic positioning actuator mounted on the carrier and operable, upon release of the clamp actuator means of both slide members, to bodily displace both slide members along the carrier slideway.

16. A machine tool including a work station whereat a slicing tool is operatively mounted, an elongate indexing mechanism carrier having a slideway extending generally towards the work station, and an indexing mechanism slidably cooperating with said slideway, the indexing mechanism being adapted to carry an elongate workpiece, and to repeatedly stepwise advance the workpiece, towards the work station by an indexing stroke of predetermined length, the indexing mechanism comprising:

1. first and second slide members, the first slide member being adapted to mount a workpiece, each slide member being provided with;
   a. a portion configured to slide in a corresponding slideway in the carrier;
   b. a clamp element assoiated with said configured portion and displaceable to clampingly cooperate with the carrier;
   c. clamp actuator means operable to releasably urge said clamp element against the carrier with a force sufficient to positively clamp the associated slide member to the carrier;
   d. spring means operable, when the associated clamp actuator means is released, to urge the clamp element against the carrier with a reduced force sufficient to resist unintentional displacement of the associated slide member;
2. means coupling said first and second slide means together, and including index actuator means operable to effect relative displacement between said first and second slide means alternately in a first direction towards each other and in a second direction away from each other, the extent of said displacement determining the indexing stroke of the mechanism;
3. control means connected to said clamp and index actuator means, operable to actuate the clamp actuator means of the first slide member and release the clamp actuator of the second slide member whilst actuating the index actuator to effect displacement in one of said first and second directions, and then actuate the clamp actuator means of the second slide member and release the clamp actuator means of the first slide member whilst actuating the index actuator means in the other of said first and second directions; and
4. adjustable index stop means adapted to precisely determine the extent of displacement in said first and second directions.

17. A machine tool as claimed in claim 16, wherein the clamp actuator means comprise at least one hydraulic actuator carried by each slide member, and the index actuator means comprises a double-acting, hydraulic linear actuator, carried by the second slide member and interconnecting the first and second slide members, and wherein said control means includes a hydraulic control circuit operable to sequentially and cyclically actuate the clamp and index actuators, the hydraulic circuit including solenoid-operated fluid control valves controlled by an electrical control circuit connected to the solenoids of the valves.

18. An indexing mechanism as claimed in claim 4, wherein the clamp actuator means comprise at least one hydraulic actuator carried by each slide member, and the index actuator means comprises a double-acting, hydraulic linear actuator, carried by the second slide member and interconnecting the first and second slide members, and wherein said control means includes a hydraulic control circuit operable to sequentially and cyclically actuate the clamp and index actuators, the hydraulic circuit including solenoid-operated fluid control valves controlled by an electrical control circuit connected to the solenoids of the valves.

* * * * *